(12) United States Patent
Kato

(10) Patent No.: US 8,198,747 B2
(45) Date of Patent: Jun. 12, 2012

(54) BLADE FOR WINDMILL, WINDMILL AND WIND POWER GENERATOR

(75) Inventor: Masaharu Kato, Nagoya (JP)

(73) Assignee: Eco Technology Co., Ltd., Nagoya-Shi, Aichi (JP)

( * ) Notice: Subject to any disclaimer, the term of this patent is extended or adjusted under 35 U.S.C. 154(b) by 553 days.

(21) Appl. No.: 12/227,944

(22) PCT Filed: Jun. 2, 2006

(86) PCT No.: PCT/JP2006/311128
§ 371 (c)(1),
(2), (4) Date: Dec. 2, 2008

(87) PCT Pub. No.: WO2007/141834
PCT Pub. Date: Dec. 13, 2007

(65) Prior Publication Data
US 2009/0167027 A1    Jul. 2, 2009

(51) Int. Cl.
*H02P 9/04* (2006.01)
*F03D 9/00* (2006.01)
(52) U.S. Cl. .......... 290/55; 290/44; 416/128; 416/223 R
(58) Field of Classification Search .............. 290/44, 290/55; 416/128, 223 R; H02P 9/04; P03D 9/00
See application file for complete search history.

(56) References Cited

U.S. PATENT DOCUMENTS

| | | | |
|---|---|---|---|
| 4,005,947 A * | 2/1977 | Norton et al. | 416/197 A |
| 4,247,253 A | 1/1981 | Seki et al. | |
| 4,264,279 A * | 4/1981 | Dereng | 416/227 A |
| 4,285,636 A * | 8/1981 | Kato et al. | 416/197 A |
| 5,417,548 A * | 5/1995 | Tangler et al. | 416/223 R |
| 6,068,446 A * | 5/2000 | Tangler et al. | 416/223 R |
| 7,614,582 B2 * | 11/2009 | Hafner | 242/609 |
| 2002/0006334 A1* | 1/2002 | Szpur | 416/197 A |
| 2003/0077178 A1* | 4/2003 | Stearns | 416/223 R |
| 2004/0047732 A1* | 3/2004 | Sikes | 416/1 |
| 2005/0099013 A1* | 5/2005 | Noguchi | 290/55 |
| 2009/0167027 A1* | 7/2009 | Kato | 290/55 |

FOREIGN PATENT DOCUMENTS

WO  WO 2004/061300 A1   7/2004

* cited by examiner

*Primary Examiner* — John K Kim
(74) *Attorney, Agent, or Firm* — Thomas, Kayden, Horstemeyer & Risley, LLP

(57) ABSTRACT

A blade for a windmill disposed around a rotation center (M) in a vertical direction so as to receive wind force, comprising a front surface (26) including;

a front nose surface (26F) being disposed at front of a traveling direction, also having a greatest average curvature a low speed airflow passing surface (26L) disposed on a closer side to the rotation center, and formed continuously from the front nose surface to rearward of the traveling direction, and a high speed airflow passing surface (26H) disposed a distant side from the rotation center, formed continuously from the front nose surface to rearward of the traveling direction with a curved surface swollen greater than the low speed airflow passing surface, and having length as viewed from the vertical direction greater than the low speed airflow passing surface.

20 Claims, 16 Drawing Sheets

BLADE FOR WINDMILL, WINDMILL AND WIND POWER GENERATOR

RELATED APPLICATION

This application is a National Stage entry of International Application No. PCT/JP2006/311128, filed on Jun. 2, 2006, the entire specification claims and drawings of which are incorporated herewith by reference.

BACKGROUND OF THE INVENTION

1. Field of the Invention

This invention relates to a blade for a windmill, a windmill and a wind power generator, and especially a vertical type windmill, a blade for a windmill used for this windmill and a wind power generator using the vertical type windmill.

2. Background of the Art

There are vertical rotation axis type and horizontal rotation axis type windmills, and nowadays horizontal rotation type ones are mainly used for wind power generation. Horizontal rotation axis type windmills have an advantage of having a greater collection rate of wind energy than that of vertical rotation axis type windmills, however the rotation efficiency decreases unless the rotation axis and blades are opposed to the wind direction, and especially they have disadvantages of speed decrease occurred by difference of the wind direction due to elevation difference between the upper and lower blades and speed decrease due to rapid change of the wind direction (for example, twister).

On the other hand, vertical rotation axis type windmills (for example, referred to Patent Document 1) can rotate regardless of the wind direction, however they have a disadvantage that a blade on one side of the vertical rotation axis receives rotation force fully, but a blade on the other side receives resistance due to the headwind.

[Patent Document 1] Japanese Laid-Open Patent Publication No. 2001-132617

Problem to be Solved by the Invention

The present invention has been developed regarding the above points, and aims to provide a windmill which is a vertical rotation type having little influence by wind direction and capable of rotating more efficiently, a blade for a windmill used for this windmill and a wind power generator using this vertical rotation type windmill.

Means for Solving the Problem

In order to solve the above problems, a blade for a windmill described in claim 1 is characterized being disposed around a rotation center in a vertical direction so as to receive wind force, comprising;

a front surface curved convexly toward a front traveling direction of a rotation direction, as viewed from the vertical direction and a back surface curved concavely toward a back traveling direction of the rotation direction, being disposed on a back surface side of the front surface, wherein the front surface includes;

a front nose surface being disposed at front of the traveling direction, also having a greatest average curvature a low speed airflow passing surface disposed on a closer side to the rotation center, and formed continuously from the front nose surface to rearward of the traveling direction, and a high speed airflow passing surface disposed a distant side from the rotation center, formed continuously from the front nose surface to rearward of the traveling direction with a curved surface swollen greater than the low speed airflow passing surface, and having length, as viewed from the vertical direction, greater than the low speed airflow passing surface.

A blade for A windmill of the present invention is a blade used for a so-called vertical rotation axis type windmill, and disposed around a rotation center of a vertical direction. Also, it is provided with a front surface and a back surface.

The front surface is curved convexly toward a front traveling direction of a rotation direction, as viewed from a vertical direction. This front surface comprises a front nose surface, a low speed airflow passing surface and a high speed airflow passing surface. The front nose surface is disposed on front of the traveling direction within the front surface, and is a part having the greatest average curvature. The low speed airflow passing surface is disposed on a closer side to the rotation center, and formed continuously from the front nose surface to rearward of the traveling direction. The high speed airflow passing surface is disposed on a distant side from the rotation center, formed continuously from the front nose surface to rearward of the traveling direction. Also, the high speed airflow passing surface comprises a curved surface swollen greater than the low speed airflow passing surface, and having length, as viewed from the vertical direction, greater than the low speed airflow passing surface. Additionally, by the term "being swollen greater than the low speed airflow passing surface means", it is meant when headwind from front of the front nose surface flows to backward, divided into the low speed airflow passing surface side and the high speed airflow passing surface side, being swollen in order to have airflow speed passing on the high speed airflow passing surface side faster than that of the low speed surface side.

As explained above, by having the low speed airflow passing surface and the high speed airflow passing surface, lift force acts on the blade, when receiving headwind from front. The direction of this lift force including elements toward front of the traveling direction allows the blade to rotate forward.

On the other hand, the back surface is disposed on a back surface side of the front surface. The back surface side is a concave shaped side of the convexly curved front surface. The back surface side is curved concavely toward back of the traveling direction. This shape allows the back surface to receive wind efficiently.

According to a blade for a windmill of the present invention, lift force by receiving wind on the front surface in a case of headwind, and resistance force by receiving wind on the back surface in a case of tailwind allows the blade to rotate with strong force toward front of the traveling direction.

The blade for a windmill described in claim 2 is a blade for a windmill as claimed in claim 1, wherein the back surface has an arc shape having a smaller curvature than the average curvature of the front surface.

The back surface comprising an arc shape having a smaller average curvature as described above allows airflow around the back surface to be stable. Also, wind from backward can be caught effectively with a large area of the concaved shape.

The blade for a windmill described in claim 3 is characterized that, as viewed from a vertical direction, the rotation center is disposed on an extension of an arc composed of the back surface.

The back surface having the above shape allows airflow hitting the back surface to flow toward the rotation center smoothly.

A windmill described in claim 4 is provided with a rotation center in a vertical direction, and comprising a plurality of the blades claimed in claims 1 to 3.

The windmill of the present invention can, as described above, produce lift force to headwind form the front surface, and also receive wind efficiently on the back surface, so as to rotate efficiently. It may comprise the number of the blades of more than 2, 3, 4, 5, 6 or the like.

The windmill described in claim 5 is characterized by comprising a wind tunnel between the blades for the windmill and the rotation center, so as to allow wind to pass through.

Comprising the wind tunnel as described above allows wind to pass through the wind tunnel so as to give rotation force to a blade disposed on a leeward side.

The windmill described in claim 6 is characterized that three blades of the windmill are disposed around the rotation center at an equally-spaced center angle.

By disposing three blades for the windmill equally-spaced, as described above when other blades would not be disposed on a point-symmetrical position with respect to the rotation center, and either one of the blades is disposed on a position to receive wind toward the traveling direction most strongly, the blade at the point-symmetrical position can avoid to receive the wind to the opposite direction most strongly, so as to rotate efficiently.

The windmill described in claim 7 is characterized that, as viewed from a vertical direction, a traveling direction back end portion of the high speed airflow passing surface is disposed at a farthermost position form the rotation center, and a traveling direction back end portion of the low speed airflow passing surface is disposed at a closest position to the rotation center.

Disposing the three blades for a windmill as described above allows lift force and resistance force to occur efficiently, so as to rotate the windmill efficiently.

The windmill described in claim 8 is characterized that, as viewed from a vertical direction, the front nose surface is disposed adjacent to an extension of a line connecting the back end of the traveling direction of the high speed airflow passing surface and the rotation center.

Disposing the three blades for a windmill as described above allows airflow to hit the back surface of the blade for the windmill on the leeward through the wind tunnel.

The wind power generator described in claim 9 is provided with the windmill claimed in any one of claims 4 to 8.

This wind power generator is, as provided with the above mentioned efficiently-rotating windmill, capable of generating power efficiently.

The wind power generator described in claim 10, comprises a first windmill comprising the windmill claimed in any one of claims 4 to 8, a second windmill comprising the windmill claimed in any one of claims 4 to 8, having the common rotation center with the first windmill, and disposed to rotate in an opposite direction from the first windmill, and a power generating device disposed between the first windmill and the second windmill, and provided with a field magnet operating simultaneously with rotation of the first windmill so as to rotate in the same direction as the first windmill and an armature coil operating simultaneously with rotation of the second windmill so as to rotate in the same direction as the second windmill.

According to the above configuration, the field magnets and the armature coils rotate respectively in an opposite direction to each other, and the armature coil traverses a magnetic field by the field magnet, so as to generate power more effectively than a case that only one of them rotates.

TECHNICAL ADVANTAGE OF THE INVENTION

According to a blade for a windmill and a windmill of the present invention, a vertical rotation type windmill having less influence by wind directions can rotate more effectively.

Also, according to a wind power generator of the present invention, the windmill has less influence by wind direction so as to rotate efficiently allows power to be generated more efficiently.

BEST MODES FOR CARRYING OUT THE INVENTION

Figure 1:
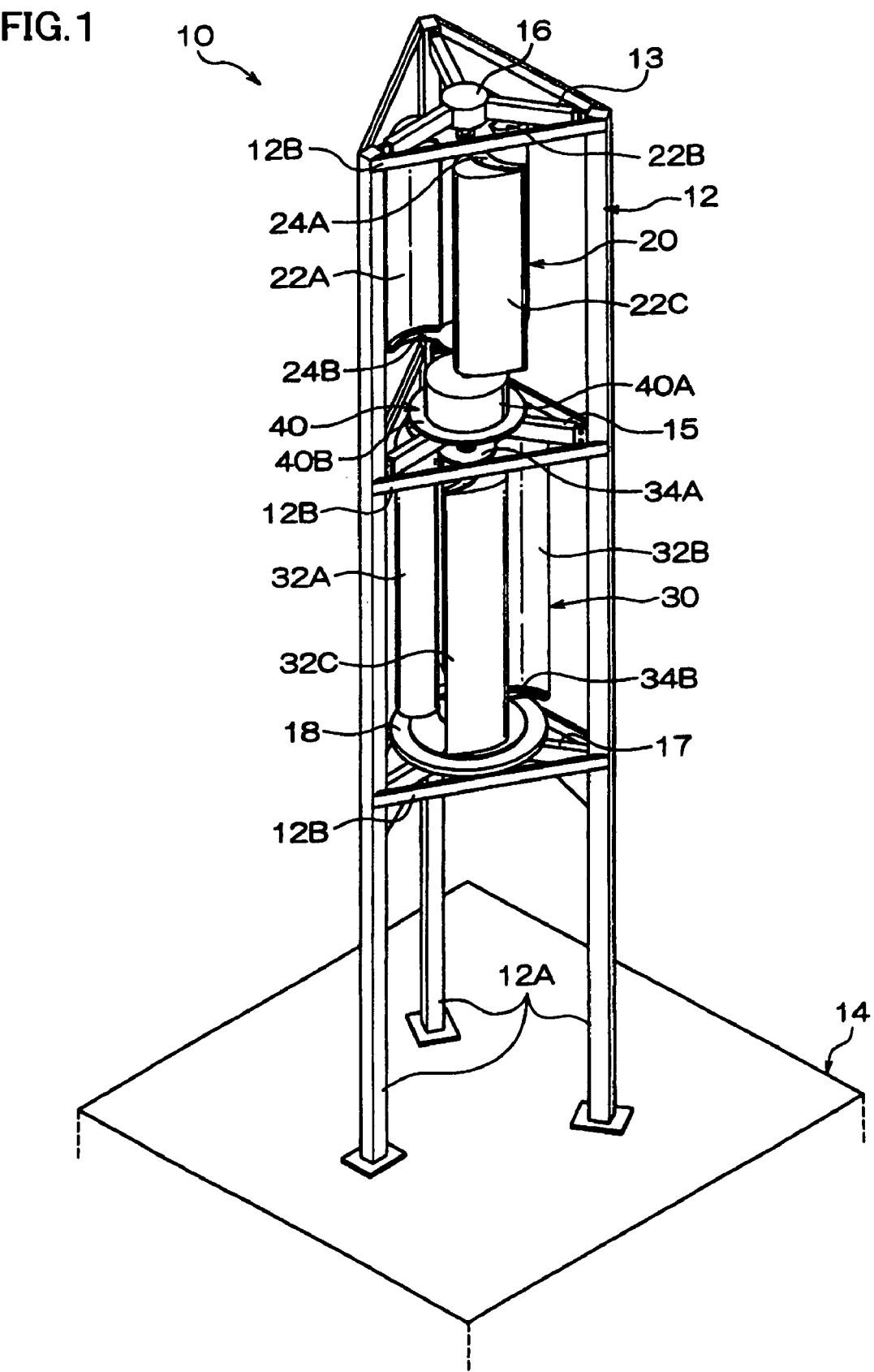
FIG. 1 is a perspective view of a wind power generator, as an embodiment of the present invention.

Hereinafter, referring to the drawings, embodiments of blades for a windmill, a windmill and wind power generator of the present invention will be explained.

Figure 2:
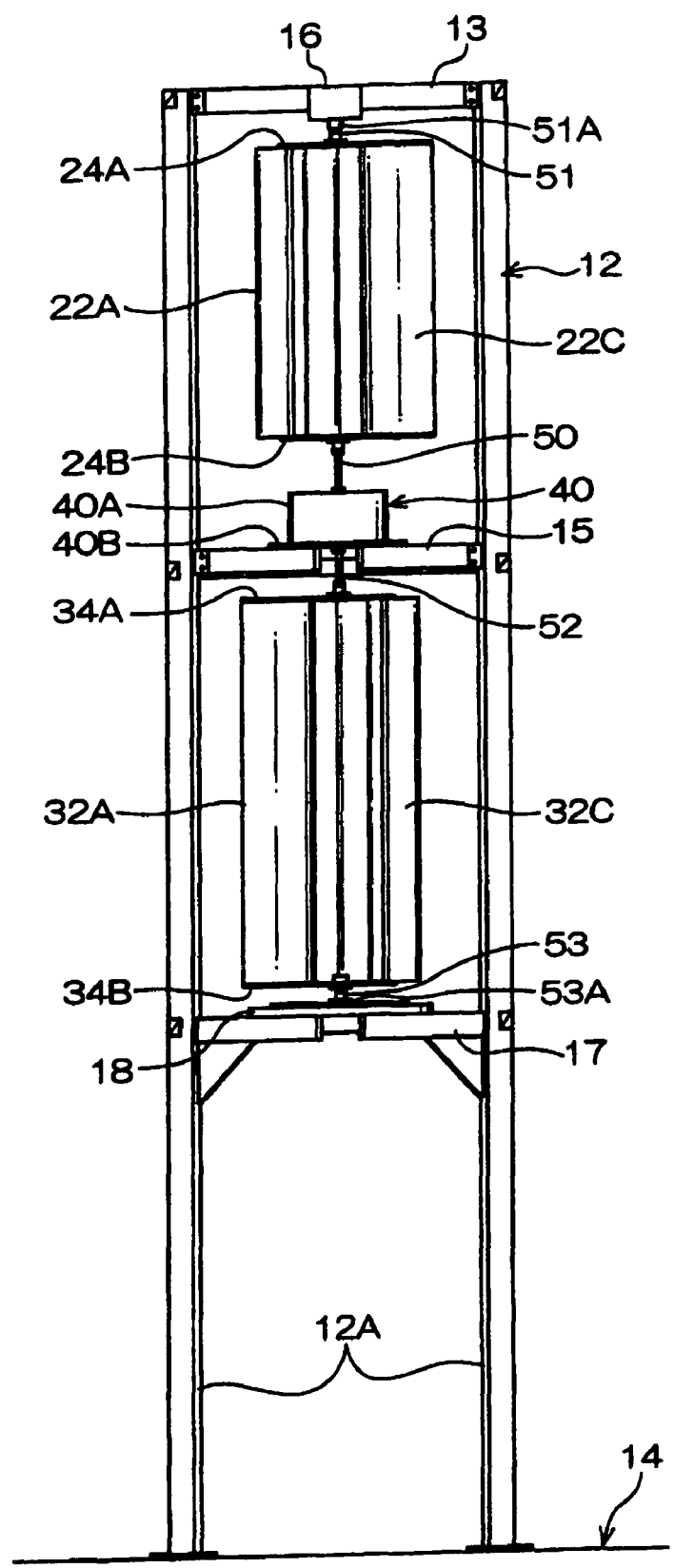
FIG. 2 is a side view of a wind power generator, as an embodiment of the present invention.
Figure 3:
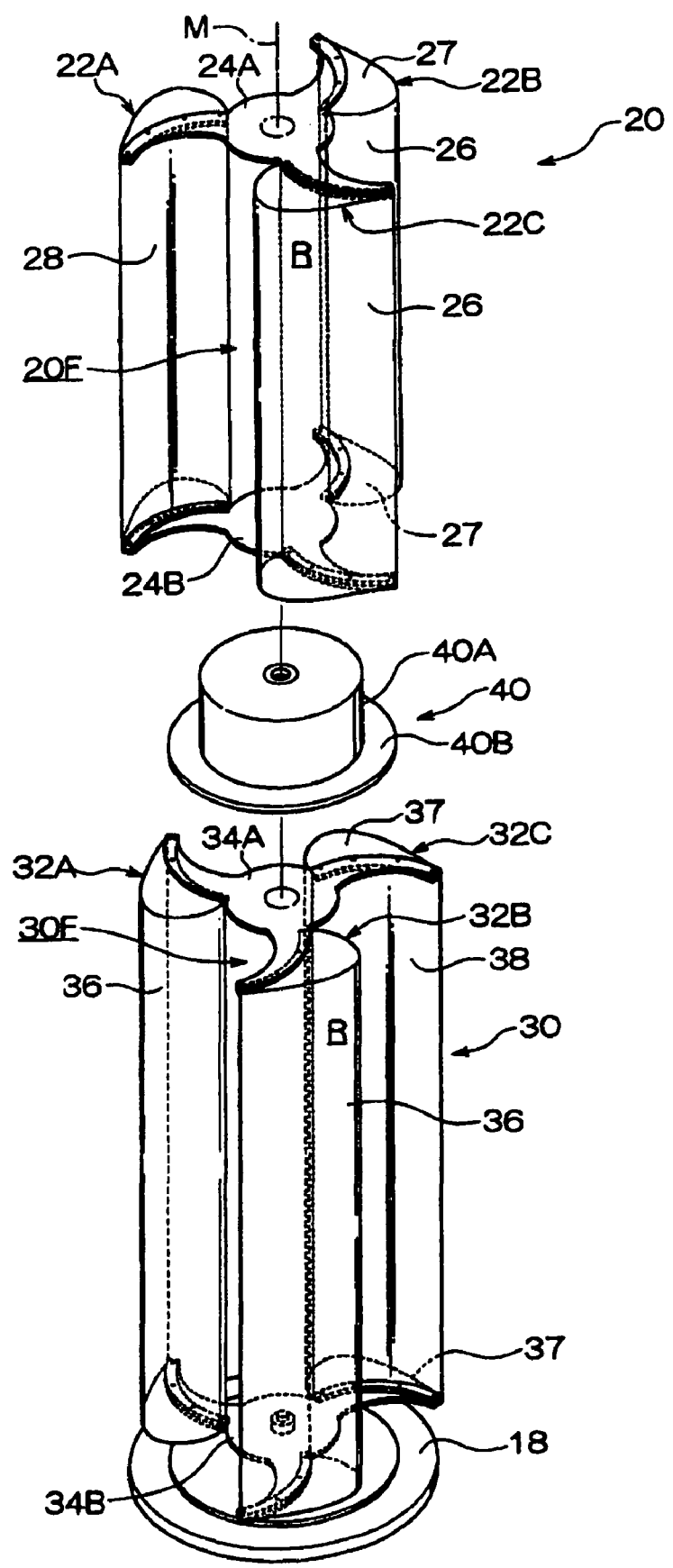
FIG. 3 is a perspective view of a first windmill, a second windmill and a power generator, as an embodiment of the present invention.

As shown in FIGS. 1 to 3, a wind power generator 10 comprises a frame 12, a first windmill 20, a second windmill 30 and a power generating device 40.

The frame 12 comprises three columns 12A provided protrudingly in a vertical direction on a base 14 and a plurality of beams 12B connecting between the respective columns 12A. The three columns 12A are disposed, as viewed from a vertical direction, at apex positions of a substantially equilateral triangle, and the beams 12B connect the respective columns 12A at three height positions including a top end portion of the columns 12A. The three beams 12B at each height position configure an equilateral triangle shape.

A first windmill 20 and a second windmill 30 are so-called vertical side windmills, as shown in FIG. 3, having a common rotation center M disposed in a vertical direction. Also, the rotation center M is a virtual rotation axis, and in this embodiment, the rotation axis, mentioned below, does not penetrate the first windmill 20 and the second windmill 30, and is disposed above and below of each other.

The first windmill 20 comprises three blades 22A, 22B, 22C and two blade plates 24A, 24B. The three blades 22A, 22B, 22C and the two blade plates 24A, 24B have the same shapes respectively and the different fixing positions, so as to be collectively called blade 22 and plate 24.

Also, as a material of the blade 22, light alloy and reinforced plastic such as aluminum, duralumin and titan may be used.

Figure 4:
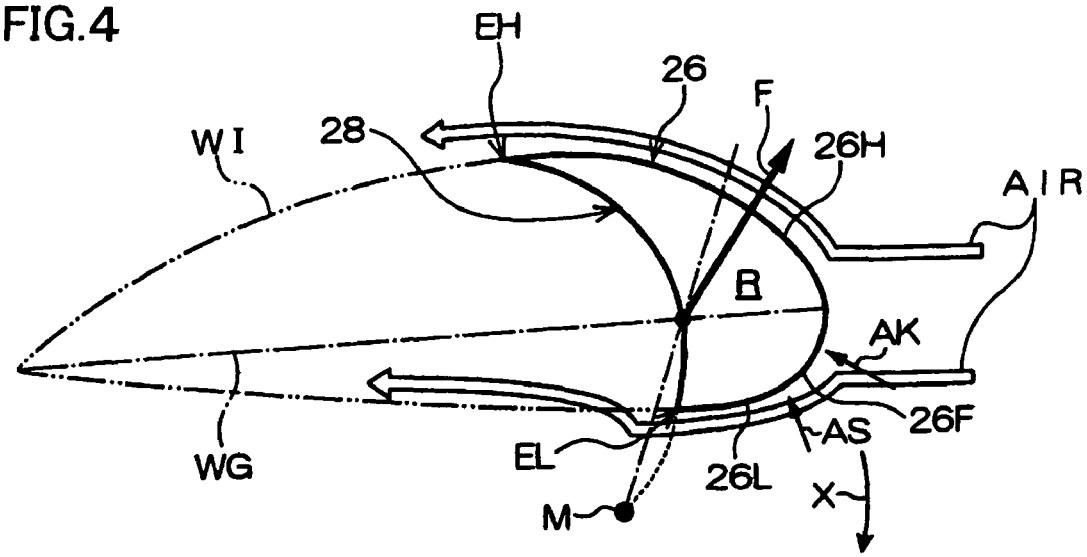
FIG. 4 is a schematic view of an outer shape and a rotation center of the blade, as viewed from a vertical direction, as an embodiment of the present invention.

The blade 22 is, as viewed from a vertical direction, as shown in FIG. 4, assuming a wing profile WI, shaped using a front portion thereof. The wing profile WI is a shape similar to a cross section of wings of general airplanes, capable of producing lift force to wind from front (the arrow AIR), and shaped being swollen on one side greater than the other.

Supposed that a relative wind direction caused by rotation as AK and natural wind as AS, lift force F acts on the blade 22, so as to rotate around the rotation center M in a direction X.

The blade 22, on cross section as viewed from a vertical direction, has the same shape on any horizontal cross section positions. As viewed from a vertical direction, it comprises a front plate 26 on front of the traveling direction, and a back plate 28 on back of the traveling direction, having a hollow shape.

The front plate 26 is curved convexly toward front of the traveling direction, comprising a front nose surface 26F, a low speed airflow passing surface 26L and a high speed airflow passing surface 26H. The front plate 26 has a shape capable of rotating toward front of the traveling direction, when receiving wind from front so as that lift force acts thereon.

The front nose surface 26F comprises a portion having the greatest average curvature of the curved front plate 26, and disposed on front of the traveling direction.

The low speed airflow passing surface 26L is disposed on a closer side to the rotation center M, and formed continuously from the front nose surface 26F to rearward of the traveling direction. A traveling direction back end portion EL of the low speed airflow passing surface 26L is disposed on the closest position of the blade 22 to the rotation center M.

The high speed airflow passing surface 26H is disposed on a distant side from the rotation center M, and formed continuously from the front nose surface 26F to rearward of the traveling direction. As viewed from a vertical direction, as shown in FIG. 4, in a case of considering a blade chord WG of a wing profile WI, the high speed airflow passing surface 26H has a curved surface more swollen in a direction receding from the blade chord WG than the low speed airflow passing surface 26L. Also, length of the high speed airflow passing surface 26H is extended to rearward of the traveling direction more than the low speed airflow passing surface 26L. A traveling direction back end portion EH of the high speed airflow passing surface 26H is disposed on the farthermost position of the blade 22 from the rotation center M, and also disposed on a further back side from the traveling direction than the back end portion EL of the low speed airflow passing surface 26L.

The back plate 28 is disposed on a back surface side (concaved shape side) of the front plate 26, and connects the back end portion EL of the low speed airflow passing surface 26L and the back end portion EH of the high speed airflow passing surface 26H, curved concavely to rearward of the traveling direction. This curved shape is, as viewed from a vertical direction, a arc shape, which is a part of circular arc. A curvature of this circular arc is smaller than the average curvature of the entire front plate 26, and comprising hollow space R between the front plate 26 and the back plate 28. Also, at a position where this circular arc is extended to the rotation center M side, the rotation center M is disposed.

Figure 5:
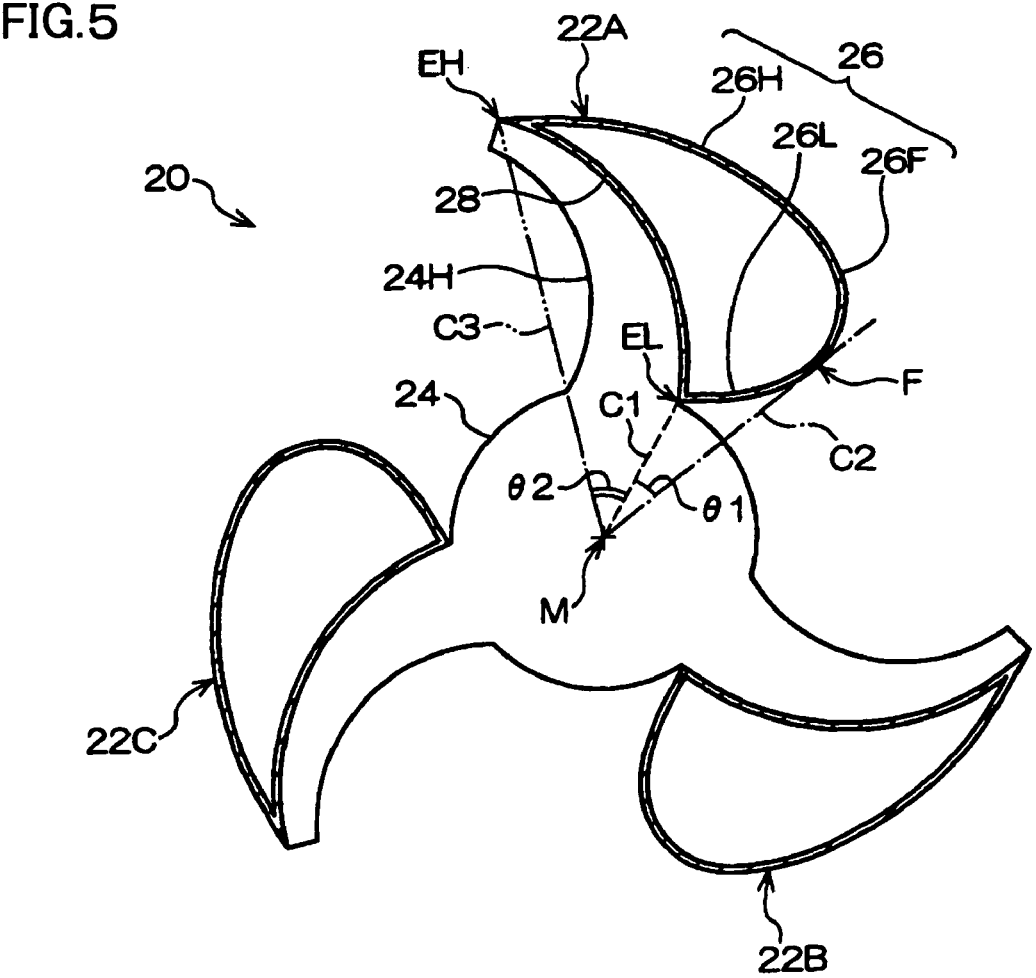
FIG. 5 is a top view showing a fixing angle of the blade, as an embodiment of the present invention.

As shown in FIG. 5, supposing a line passing through the rotation center M and the back end portion EL of the low speed airflow passing surface 26L as C1, a line passing through a front portion F of the blade 22 and the rotation center M as C2 and a line passing through an end portion EH of the blade 22 (being coincident with the back end portion of the high speed airflow passing surface 26H) and the rotation center M as C3, an angle θ2 formed between C1 and C3 is greater than an angle θ1 formed between C1 and C2. Having these fixing angles allows airflow having entered a first wind tunnel 20F, which will be explained later, to efficiently hit the back plate 28 of the blade 22 disposed on a leeward side, so as to rotate the blade 22 efficiently.

An upper end portion and a lower end portion of the blade 22 comprise, as shown in FIG. 3, cover plates 27, so as to close the space R.

Figure 6:
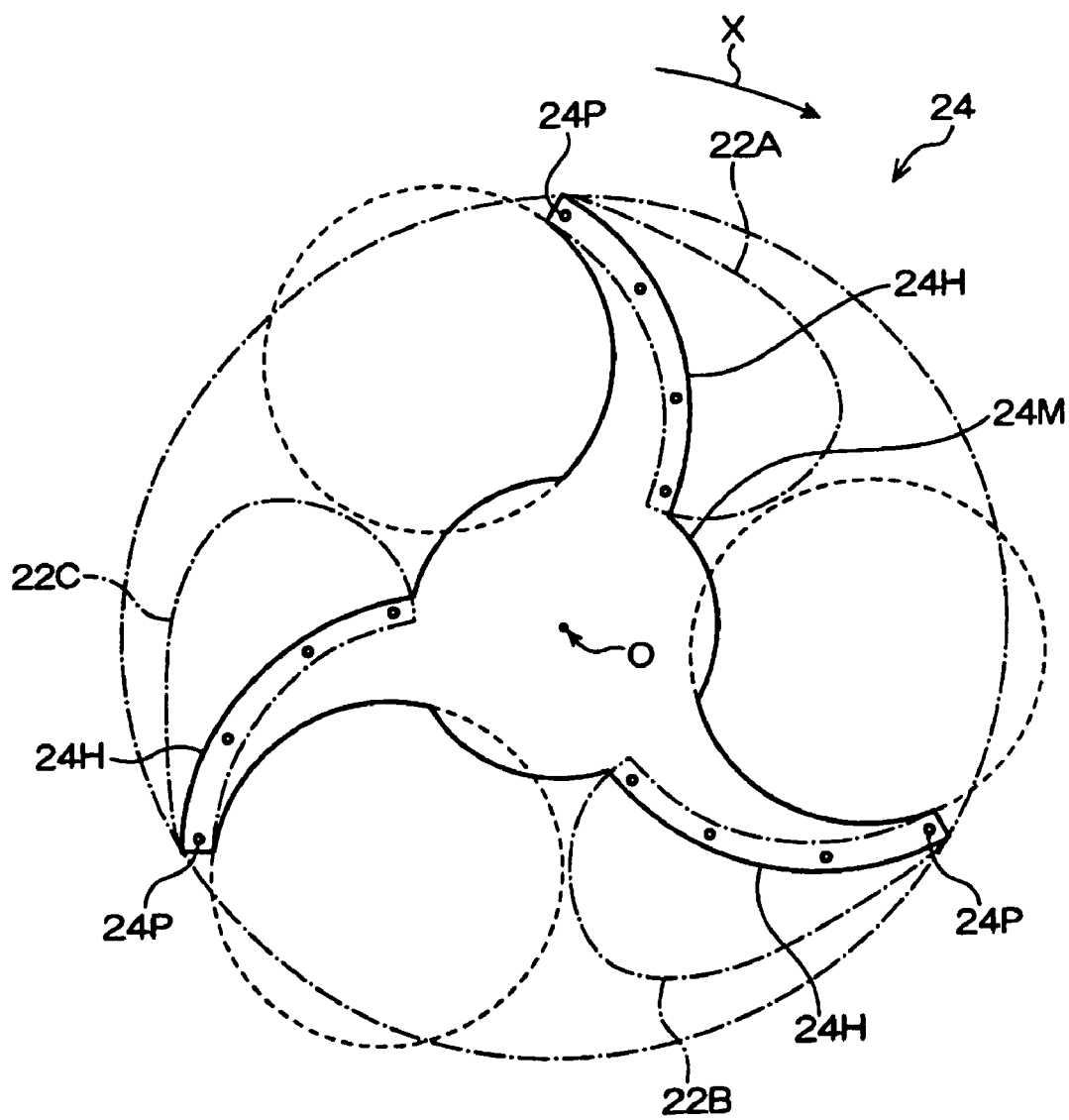
FIG. 6 is a top view showing a blade plate of the first windmill as an embodiment of the present invention.

The blade plate 24 is a plate shape, as shown in FIG. 6, comprising a disk portion 24M being disk shaped and disposed at the center portion and three blade fixing portions 24H extending from the disk portion 24M to outwardly. The blade fixing portions 24H are disposed around the disk portion 24M equally-distanced and radially. The traveling direction front side (Arrow X direction) of the blade fixing portions 24H is circular arc shaped having the same curvature as that of the back plate 28 of the blade 22, and the traveling direction back side of the blade fixing portions 24H has a smaller curvature than that of the back plate 28 of the blade 22. The outmost portion of the three blade fixing portions 24H is disposed on the concentric circle having a center O as a center.

A front nose portion of the blade fixing portion 24H has a plurality (four in the embodiment) of fixture holes 24P formed along the arc shape. This front nose portion and a back edge of the cover plate 27 of the blade are overlapped, and fixed to the cover plate 27 by inserting screws (not shown in figures) from the fixture holes 24P, so that the blade 22 is fixed to the blade fixing portions 24H. The three blades 22A, 22B, 22C are similarly fixed to other blade fixing portions 24H, and the blade plates 24A and 24B are disposed respectively on the top surface and the bottom surface of the blade 22.

As shown in FIG. 3, at an intermediate portion between the blade plates 24A, 24B, surrounded by the blade 22, no rotation shift exists and a first wind tunnel 20F, which is a hollow space, is provided. At a center portion upper side of the blade plate 24A, as shown in FIG. 2, a first upper axis 51 is fixed to be disposed along the rotation center M, and at a center portion lower side of the blade plate 24B, a first lower axis 50 is fixed to be disposed along the rotation center M.

A second windmill 30, as shown in FIG. 3, comprises three blades 32A, 32B, 32C and two blade plates 34A, 34B. The blade plates 34A, 34B have the same shape as the blade plates 24A, 24B of the first windmill 20. The blades 32A, 32B, 32C have approximately the same shape as the blades 22A, 22B, 22C of the first windmill 20, and comprising front plates 36, back plates 38 and cover plates 37. The blade 32 has a different length only in a vertical direction from the blade 22, and the length in a vertical direction of the blade 32 is configured to be longer than length in the same direction of the blade 22. The blade 32 is fixed to the blade plate 34 in the same manner as the first windmill 20, and at a portion between the blade plate 34A and the blade plate 34B surrounded by the blade 32, no rotation shaft exists and a second wind tunnel 30F is provided.

As shown in FIG. 2, at a center portion upper side of the blade plate 34A, a second upper axis 52 is fixed to be disposed along the rotation center M, and at a center portion lower side of the blade plate 34B, a second lower axis 53 is fixed to be disposed along the rotation center M.

In order to rotate in an opposite direction to the first windmill 20, the second windmill 30 has the blades 32 and the blade plates 34 fixed up side down, which is opposite to the first windmill 20.

A power generating device 40, as shown in FIG. 1, comprises a cylindrical housing 40A having a cylindrical shape along the rotation center M and a flange portion 40B disposed on underneath of the cylindrical housing 40A. The flange portion 40B is fixed at the same height as the beams 12B disposed at the middle, on the beams 15 extending from each column 12A inwardly in a horizontal direction.

Figure 7A:
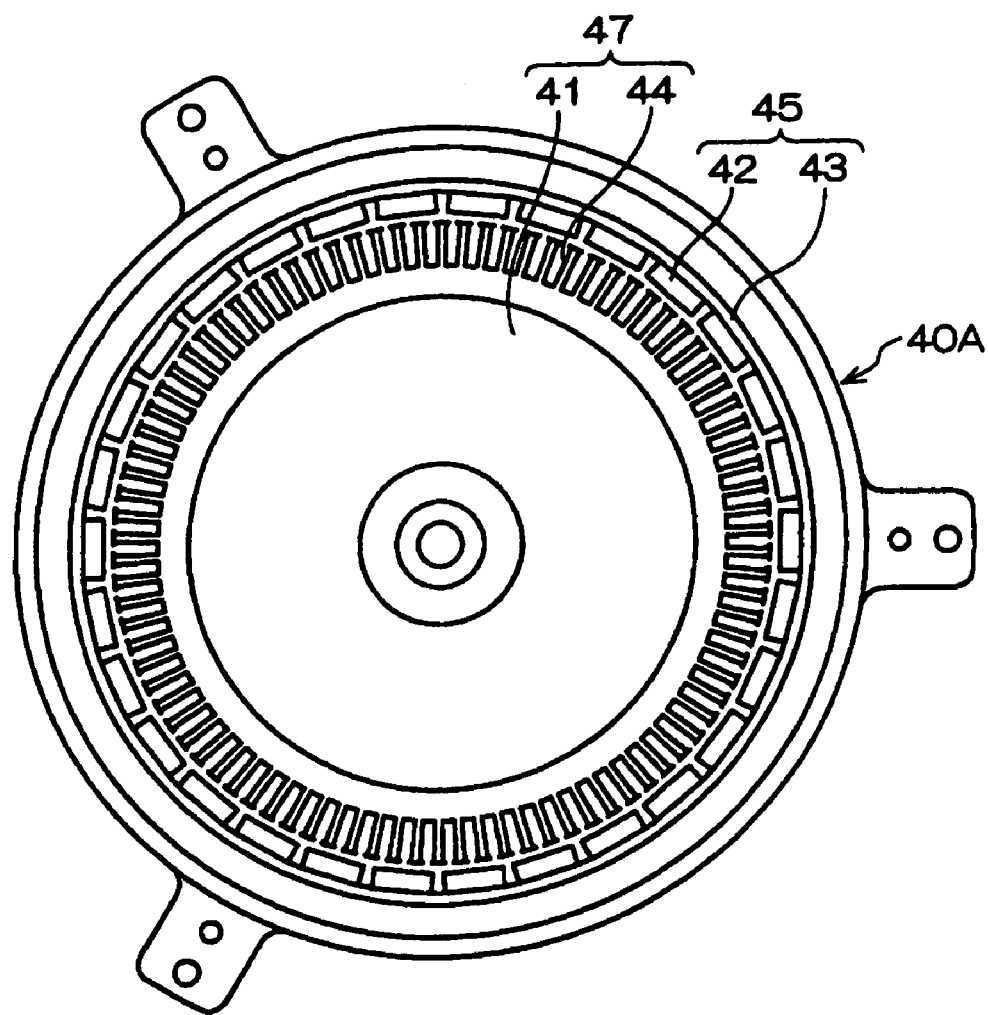
FIG. 7A is a top view showing a power generating device of the wind power generator, as an embodiment of the present invention.
Figure 7B:
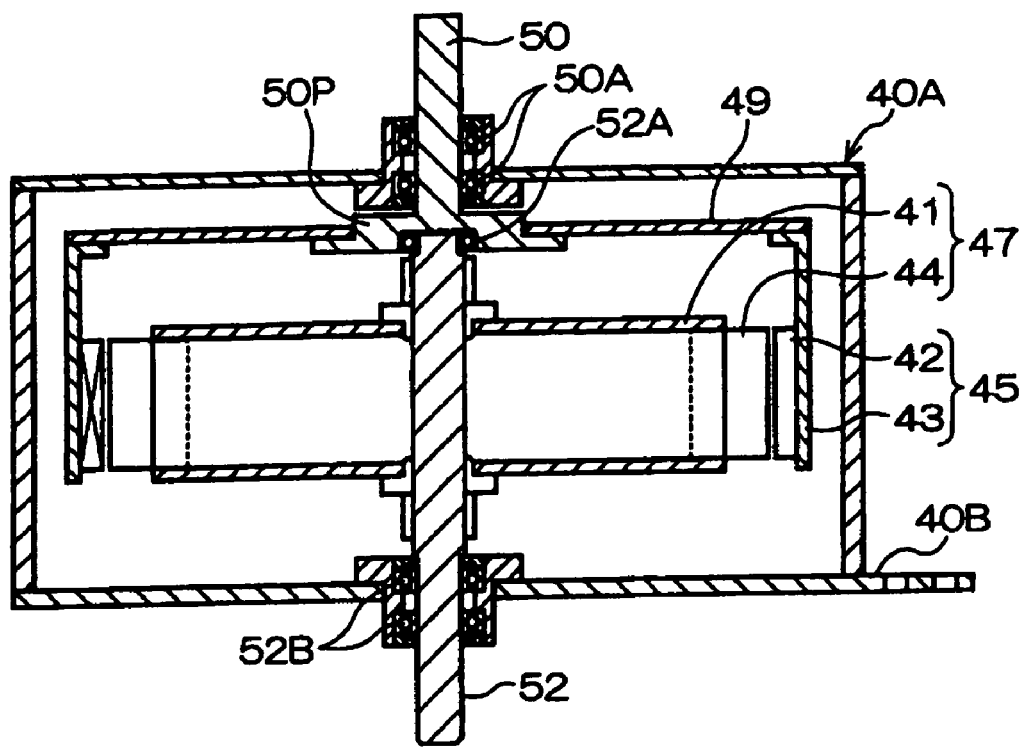
FIG. 7B is a sectional side view showing a power generating device of the wind power generator, as an embodiment of the present invention.

The power generating device 40 is configured as an alternate current power generating device having a plurality of electrodes, and as shown in FIGS. 7A and 7B, comprising field magnets 42 and armature coils 44 to traverse flux of the magnets 42 in the cylindrical housing 40A. The magnet 42 is composed of permanent magnet, and a plurality thereof are fixed inside of a fixing member 43 having a cylindrical shape, and a outer rotating member 45 comprises the fixing member 43 and the magnets 42. The armature coils 44 are disposed on a circumferential portion of a coil holding member 41 having a disk shape, and disposed on an inner side than the magnets 42 so as to be opposed to the magnets 42. An inner rotating member 47 comprises the coil holding member 41 and the armature coils 44.

Also, contrary to the above configuration, the armature coils 44 may be disposed on the outer side as the outer rotation member, and the magnets 42 may be disposed on the inner side as the inner rotating member.

As shown in FIG. 7B, the outer rotating member 45 is fixed to a circumferential lower side of a connecting member 49 having a disk shape, and also fixed to the first lower axis 50 through the connecting member 49, so as to rotate together with the first windmill 20. The first lower axis 50 has a connecting plate 50P having a flange shape at a bottom end portion, and an axis bearing 52A for the second upper axis 52, which is explained below, is provided on a center portion lower side of the connecting plate. The connecting plate 50P is fixed at the center portion of the connecting member 49.

At a rotation center portion of the inner rotating member 47, the second upper axis 52 is fixed so as to rotate integrally with the second windmill 30. An upper end portion of the second upper axis 52 is supported by the axis bearing 52A, and also rotatable relatively to the axis bearing 52A.

At an upper surface center portion of the cylindrical housing 40A, an axis bearing 50A is provided so as to support the first lower axis 50. The first lower axis 50 is supported by the axis bearing 50A so as to be rotatable. Also, at a center portion of the flange portion 40B an axis bearing 52B is provided so as to support the second upper axis 52. The second upper axis 52 is supported by the axis bearing 52B so as to be rotatable. The first lower axis 50 and the second upper axis 52 are disposed along the rotation center M, and the outer rotating member 45 and the inner rotating member 47 rotate around the common rotation center M of the first windmill 20 and the second windmill 30.

In the power generating device 40, a plurality of collector rings and brushes sliding to the collector rings not shown in a figure are provided. A half of the pairs are connected to take out alternate current generated power from the armature coils 44, and the other half of the pairs are connected to supply power for field to the magnets 42. The power for field is a part of the alternate current generated power converted to continuous current by a rectification circuit not shown in a figure.

As shown in FIG. 3, the first windmill 20, the power generating device 40 and the second windmill 30 are disposed within the frame 12 in this order from top.

As shown in FIG. 1, at a center area of the beams 12B disposed at an upper end portion of the frame 12, an axis supporting member 16 is provided. The axis supporting member 16 is supported by connecting to the three beams 13 extending from an upper end portion of each column 12A inwardly in a horizontal direction. Underneath the axis supporting member 16, an axis bearing 51A is provided (referred to FIG. 2). The axis bearing 51A supports an upper end portion of the first upper axis 51.

On the beams 17 disposed at the same height as the beams 12B disposed at the lowest position and extending in a horizontal direction from each column 12A inwardly, a stand 18 is fixed. On the stand 18, an axis bearing 53A is provided. The axis bearing 53A supports a lower end portion of the second lower axis 53.

Next, operation of the wind power generator 10 of this embodiment will be explained.

FIGS. 8A to F are figures showing airflow when each blade 22 of the first windmill 20 rotates with wind in the arrow WIND direction, so as to be disposed at a different position. The arrows A show airflow.

Figure 8A:
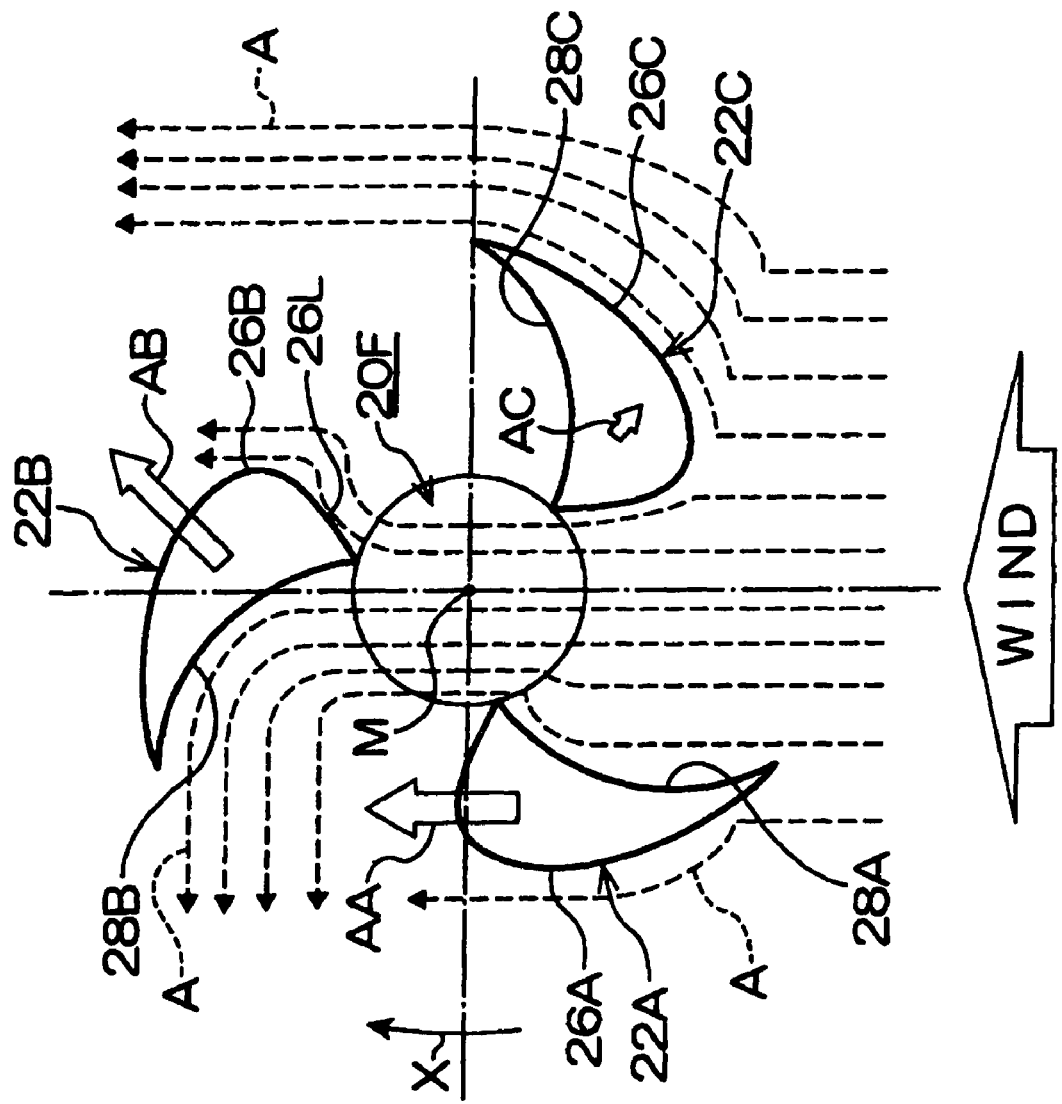
FIG. 8A is a top view showing a relation of rotation of the blades of the first windmill and airflow, as an embodiment of the present invention.

First, in FIG. 8A, the airflow A hits the back plate 28A side, so as that force in an arrow AA direction, which is approximately coincident with the traveling direction, act on the blade 22A. The airflow A having hit the back plate 28A, goes through the first wind tunnel 20F so as to hit the back plate 28B of the blade 22B.

On the blade 22B, the airflow A having flowed after hitting the blade 22A and the airflow A having entered from between the blade 22A and the blade 22C and passing through the first wind tunnel 20F hit. The former airflow A hits the back plate 28B, and the latter airflow A hits the back plate 28B and the low speed airflow passing surface 26L of the front plate 26B. At this time the back plate 28B is arc shaped, and the back end portion EH is disposed at the farthermost position from the rotation center M, and also disposed further back in the traveling direction than the back end portion of the low speed airflow passing surface 26L, so that when the back plate 28B receives the airflow A from the arrow WIN direction, force of the arrow AB including element to front of the traveling direction acts on the blade 22B.

On the blade 22C, the airflow A hits the front plate 26C side as being headwind to the traveling direction. This headwind flows backwardly divided to the low speed airflow passing surface 26L side and the high speed airflow passing surface 26H side of the blade 22C. On the blade 22C, lift force operates by speed difference of the airflow A flowing on the low speed airflow passing surface 26L side and the airflow A flowing on the high speed airflow passing surface 26H side, and force in the arrow AC direction including element of the traveling direction acts.

By the above described force in the arrow AA, AB, AC directions, the blade 22 rotates in the arrow X direction. At a position of the blade 22 in FIG. 8A, the force in the arrow AA, AB, AC directions (especially the arrow AC direction) does not have element opposite to the traveling direction, so as to allow the blade 22 to rotate efficiently.

Figure 8B:
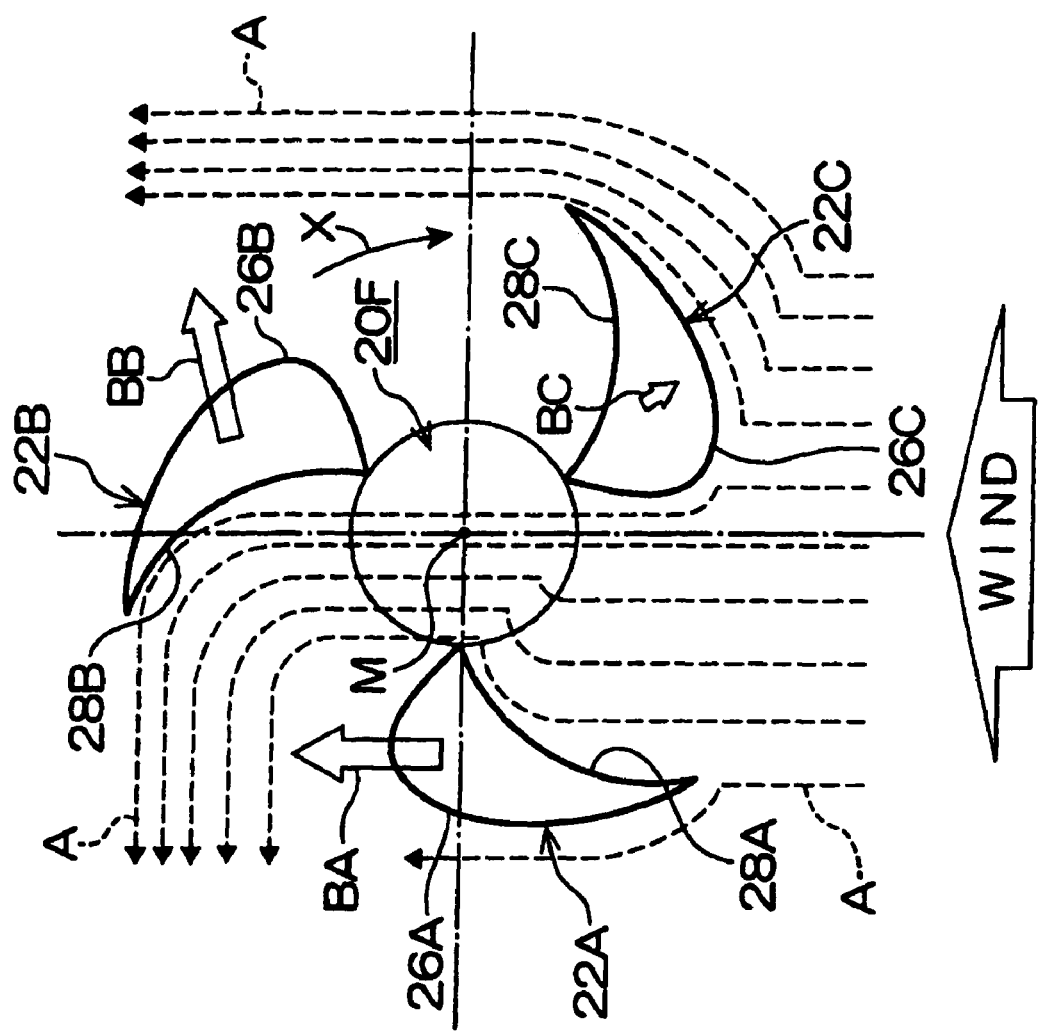
FIG. 8B is a top view showing a relation of rotation of the blades of the first windmill and airflow, as an embodiment of the present invention.

In FIG. 8B, on the blades 22A, 22C force in the arrow BA, BC directions, substantially the same as the arrow AA, AC directions in FIG. 8A, operates. Regarding the blade 22B, the airflow A having passed through the first wind tunnel 20F does not hit the front plate 26A directly (because the blade 22C is disposed on the windward), so that force in the arrow BB direction inclined to the traveling direction rather than the arrow AB direction operates. At a position of the blade 22 in FIG. 8B, force in the arrow BA, BB, BC directions (especially the arrow BC direction) does not have element opposite to the traveling direction, so as to allow the blade 22 to rotate efficiently.

Figure 8C:
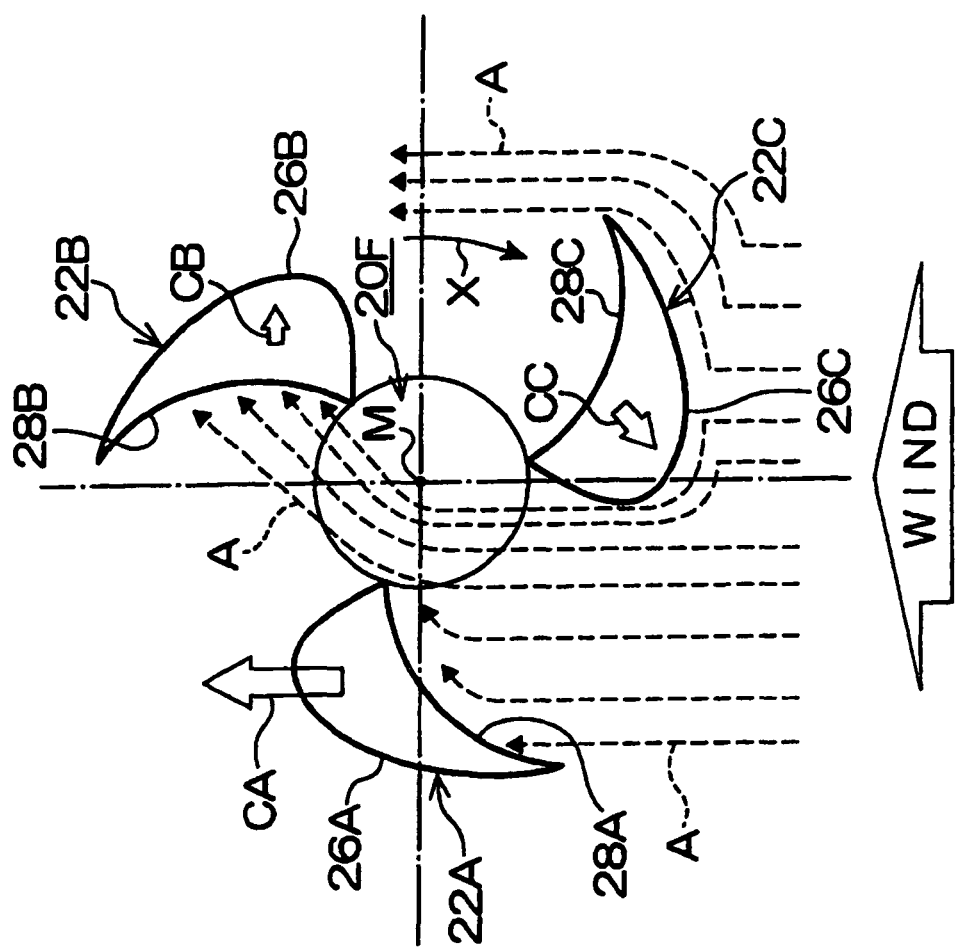
FIG. 8C is a top view showing a relation of rotation of the blades of the first windmill and airflow, as an embodiment of the present invention.

In FIG. 8C, on the blade 22A, the airflow A hits the back plate 28A side, so that force in the arrow CA direction approximately coincident to the wind direction operates. The airflow A having hit the back plate 28A changes a direction closer to inside of the first wind tunnel 20F.

Regarding the blade 22B, when the airflow A enters between the blade 22A and the blade 22C, and passes through the first wind tunnel 20F, the airflow A from the blade 22A side changes the direction so as to hit the back plate 28B. Herewith force in the arrow CB direction including element to the traveling direction side acts on the blade 22B.

Regarding the blade 22C, the front end portion of the front plate 26C is disposed further front in the traveling direction than a line drawn from the rotation center M to the arrow WIND direction, and the airflow A hits the front plate 26C, and flows divided to both sides of the front plate 26C. Force in the arrow CC direction acts on the blade 22C.

Also at a position of the blade 22 in FIG. 8C, forces in the arrow CA, CB, CC directions do not have element opposite to the traveling direction, so as to allow the blade 22 to rotate efficiently.

Figure 8D:
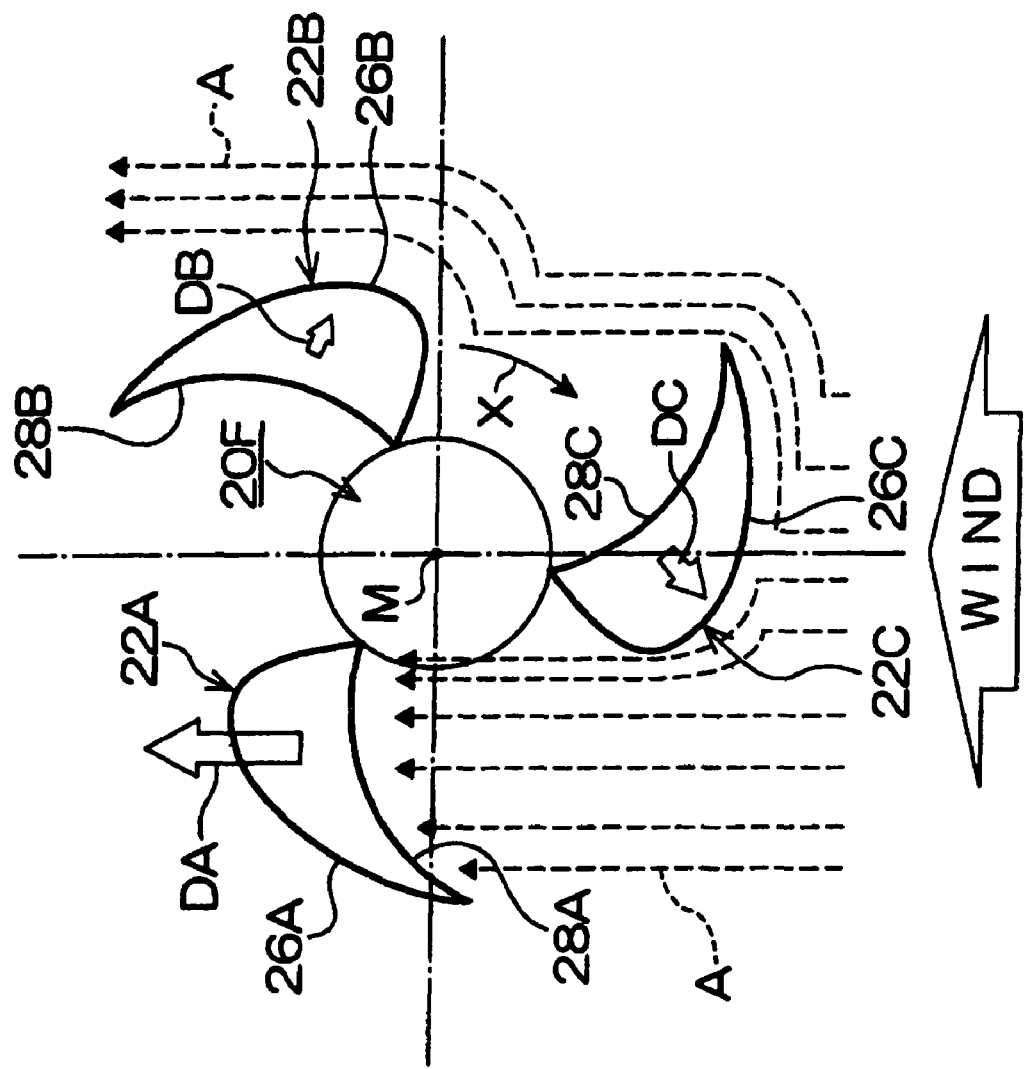
FIG. 8D is a top view showing a relation of rotation of the blades of the first windmill and airflow, as an embodiment of the present invention.

In FIG. 8D, the airflow A hits the back plate 28A side, and force in the DA direction approximately coincident with the wind direction acts on the blade 22A.

Regarding the blade 22B, the airflow A hits the front nose surface 26F of the front plate 26B, and this airflow A flows to the high speed airflow passing surface 26H side, so that force in the arrow DB direction including element to front of the traveling direction acts on the blade 22B.

Regarding the blade 22C, similarly to FIG. 8C, the airflow A hits the front plate 26C, and flows divided into both sides of the front plate 26C. Force in the arrow DC direction acts on the blade 22C.

At a position of the blade 22 in FIG. 8D, forces in the arrow DA, DB, DC directions do not have element opposite to the traveling direction, so as to allow the blade 22 to rotate efficiently.

Figure 8E:
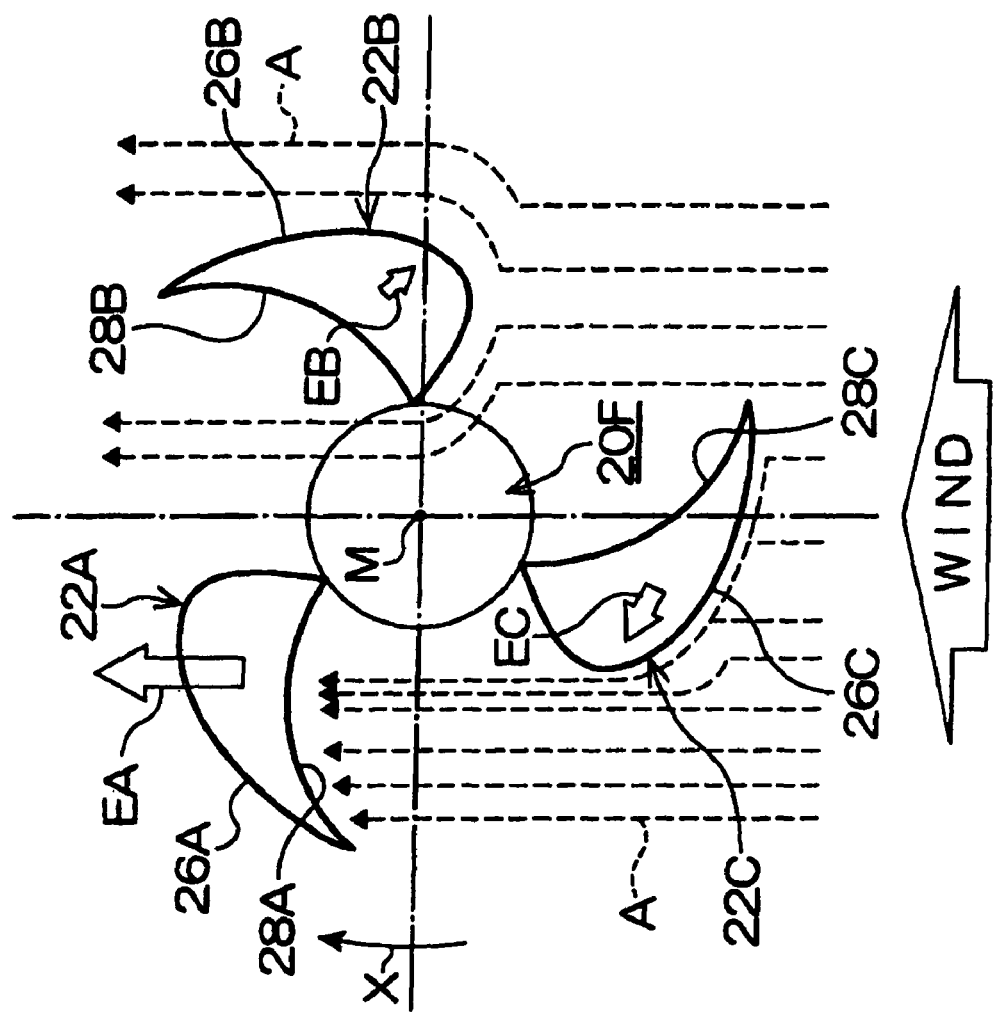
FIG. 8E is a top view showing a relation of rotation of the blades of the first windmill and airflow, as an embodiment of the present invention.

In FIG. 8E, the airflow A hits the back plate 28A, and force in the arrow EA direction approximately coincident with the wind direction acts on the blade 22A.

Regarding the blade 22B, the airflow A hits the front plate 26B side being headwind to the traveling direction. With this headwind, lift force acts and force in the arrow EB direction including element of the traveling direction acts on the blade 22C.

Regarding the blade 22C, the airflow A hits the front plate 26C, and flow toward front of the traveling direction. Because of this, force in the arrow EC direction acts on the blade 22C.

At a position of the blade 22 in FIG. 8E, forces in the arrow EA, EB, EC directions do not have elements opposite to the traveling direction, so as to allow the blade 22 to rotate efficiently.

Figure 8F:
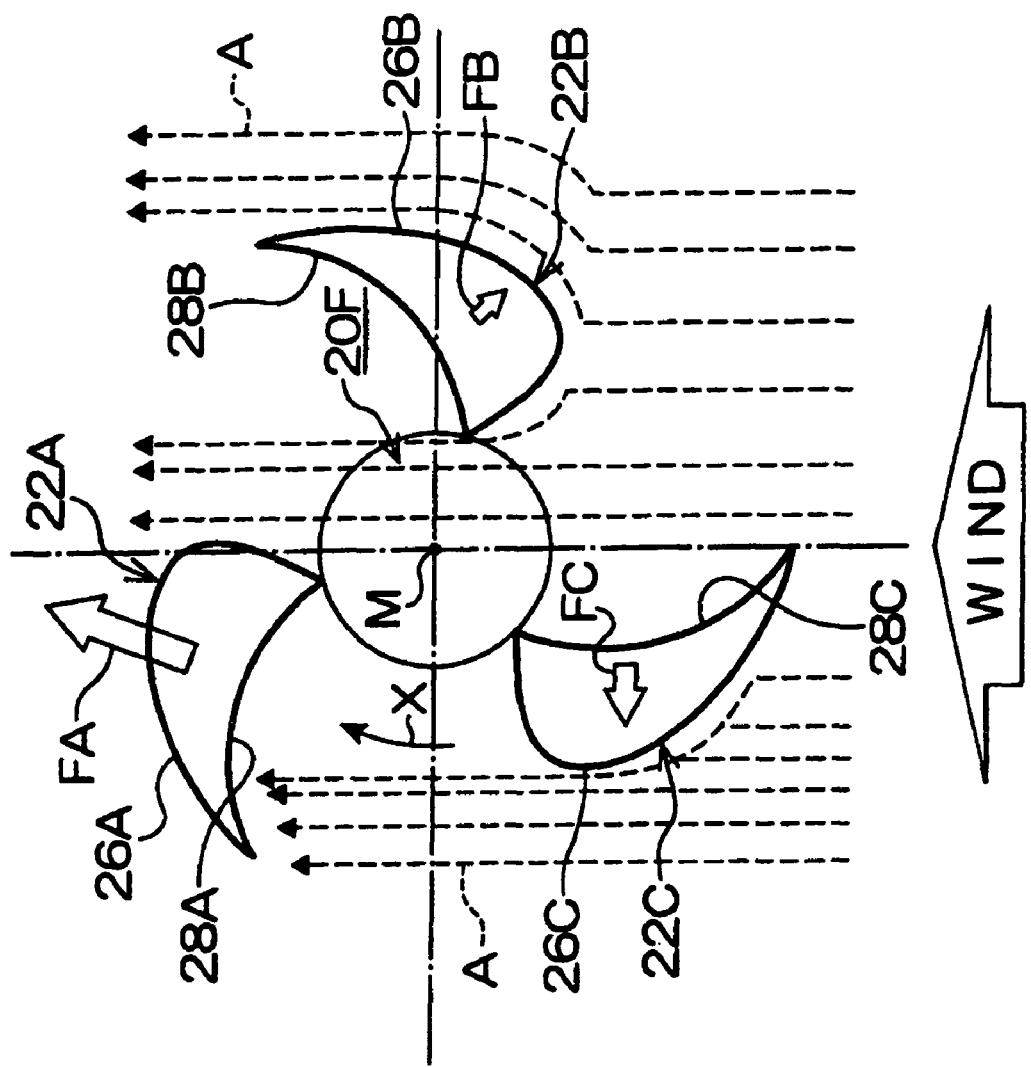
FIG. 8F is a top view showing a relation of rotation of the blades of the first windmill and airflow, as an embodiment of the present invention.

In FIG. 8F, regarding the blade 22A, the airflow A hits a position far from the rotation center M of the back plate 28A. Because of this, force in the arrow FB direction including element to front of the traveling direction acts on the blade 22.

Regarding the blade 22B, the airflow A hits the front plate 26B side, lift force acts on the blade 22C, and force in the arrow FB direction including element in the traveling direction operates.

Regarding the blade 22C, the airflow A hits the front plate 26C, and then flows toward front of the traveling direction. Because of this, force in the arrow FC direction acts on the blade 22C. At a position of this blade 22, forces in the arrow FA, FB, FC directions do not have elements opposite to the traveling direction, so as to allow the blade 22 to rotate efficiently.

Figure 9A:
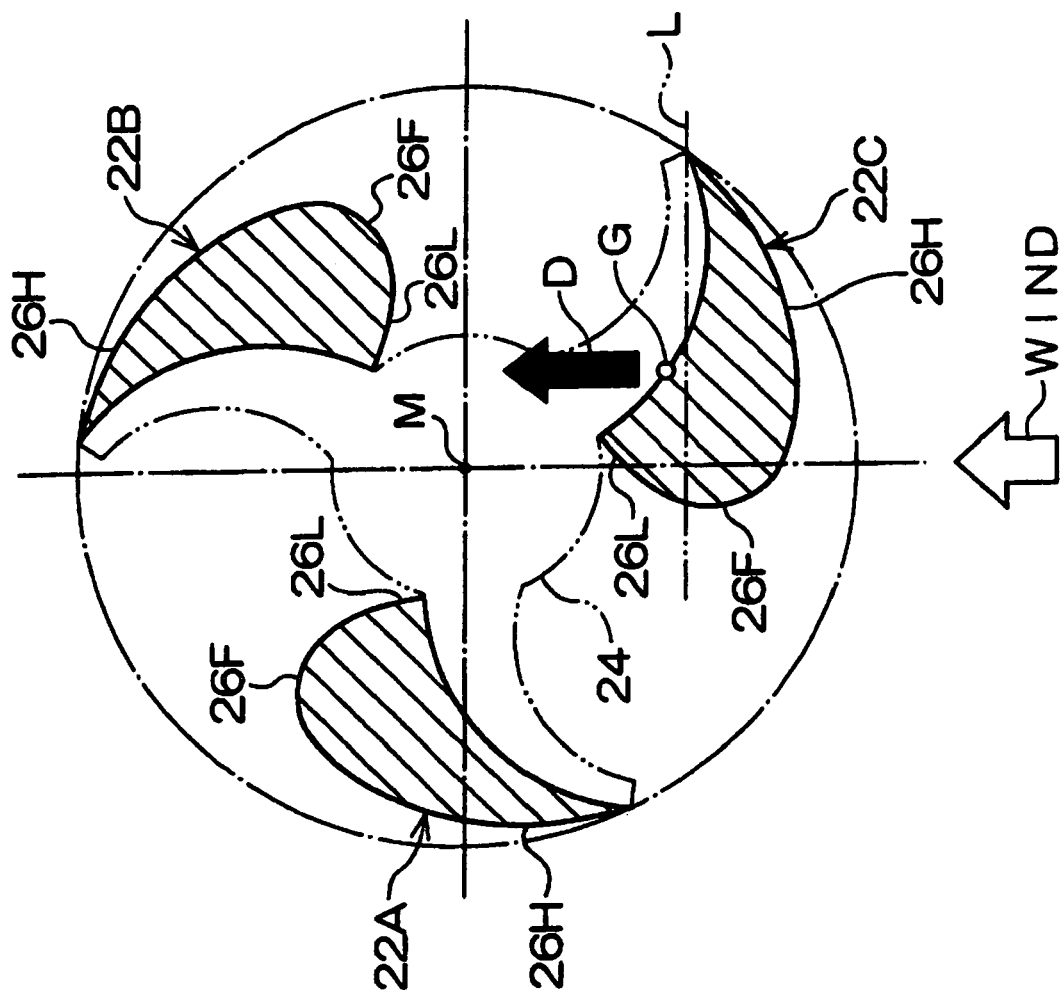
FIG. 9A is a top view showing a relation of the rotation center and the gravity center position of the blades of the first windmill, as an embodiment of the present invention.
Figure 9B:
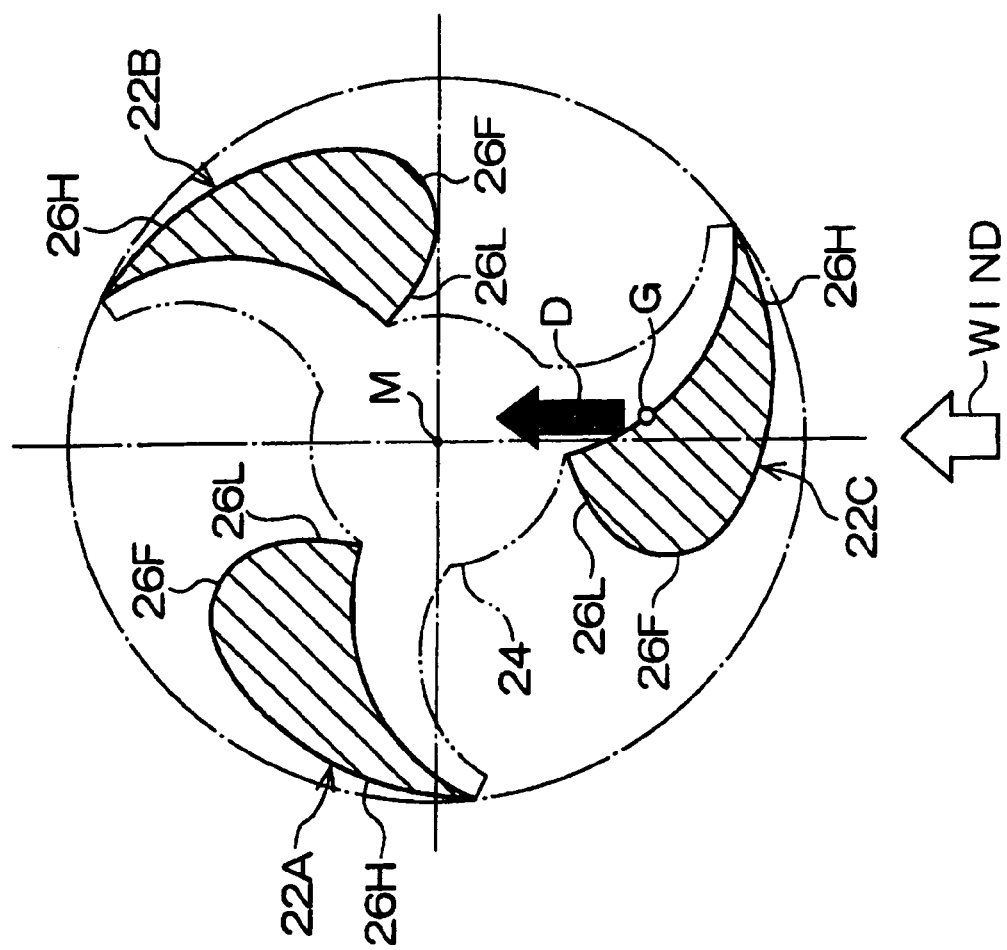
FIG. 9B is a top view showing a relation of the rotation center and the gravity center position of the blades of the first windmill, as an embodiment of the present invention.

FIGS. 9A and 9B are, when the blade 22 is disposed at a position considered to receive largest force opposite to the rotation direction from wind in the arrow WIND direction, drawings showing a relation of the gravity center G of the blade 22 and the rotation center M.

As shown in FIG. 9A, when considering a virtual line L from the back end portion of the high speed airflow passing surface 26H to the farthermost position of the low speed airflow passing surface 26L, at a position of the blade 22 where this virtual line L is disposed at a position to be normal to the arrow WIND direction (at a position considered to have a largest area that the airflow hits directly), as viewed from the arrow WIND direction, the gravity center G is disposed at a position closer to the rotation center M. Accordingly, compared with a case of disposing the gravity center G at a position far from the rotation center M, even when wind in the arrow WIND direction having the same force hits the blade 22, element of force in a direction opposite to the traveling direction can be decreased.

Also, as shown in FIG. 9B, at a position of the blade 22 where the airflow hits the high speed airflow passing surface 26H in a direction normal to this (a position considered to have great resistance force by the airflow A), as viewed from the arrow WIN direction, the gravity center G is disposed at a position substantially overlapped with the rotation center M. Therefore, even if force in the arrow WIND direction (shown with the arrow D) acts on the blade 22, element of force in a direction opposite to the traveling direction can be decreased.

Figure 10:
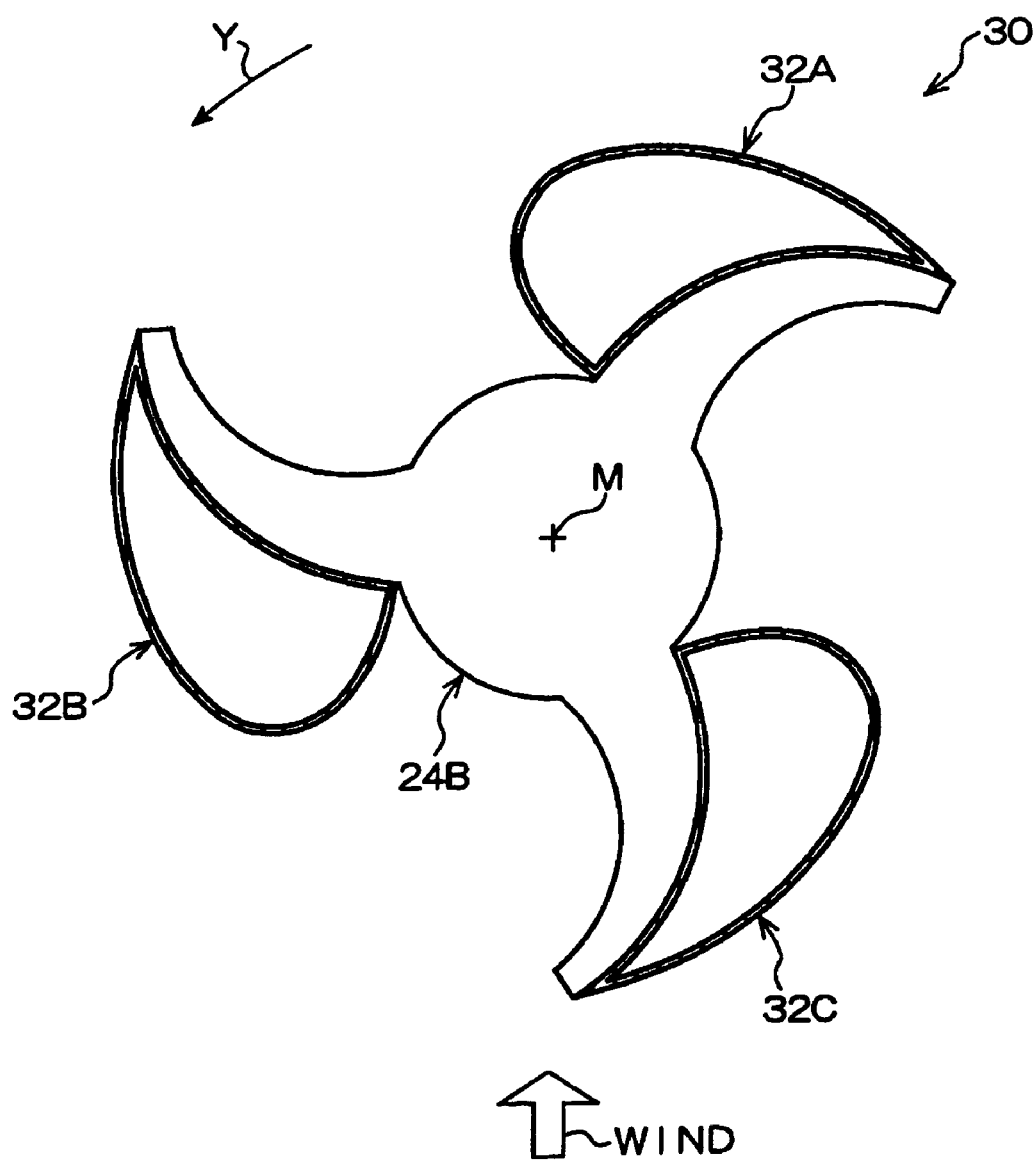
FIG. 10 is a top view showing a relation of rotation of the blades of the second windmill and airflow, as an embodiment of the present invention.

Also, regarding the second windmill 30, as shown in FIG. 10, it only has a opposite rotation direction (the arrow Y direction) to that of the first windmill 20, and rotates similarly to the first windmill 20 to wind in the arrow WIND direction.

As mentioned above, the blades 22A, 22B, 22C of the first windmill 20 and the blades 32A, 32B, 32C of the second windmill 30 do not have element of an opposite direction to the traveling direction regardless receiving airflow from any directions. Accordingly, regardless wind from any directions, the first windmill 20 can rotate efficiently in the arrow X direction, and the second windmill 30 in the arrow Y direction.

Accordingly, when the first windmill 20 and the second windmill 30 rotate, according to rotation of the first windmill 20, the first lower axis 50 rotates, so that the outer rotating member 45 fixed to the first lower axis 50 rotates in the arrow X direction. Also, according to rotation of the second windmill 30, the second upper axis 52 rotates, so that the inner rotating member 47 fixed to the second upper axis 52 rotates in the arrow Y direction. By this rotation, the armature coils traverse flux of the magnets 42, so as to generate power.

Here, the first windmill 20 and the second windmill 30 rotate in the opposite direction to each other approximately at the same speed. Because of this, a relative rotation speed of the magnets 42 provided in the outer rotating member 45 and the armature coils 44 provided in the inner rotating member 47 is a rotation speed twice faster than a case that either one of the magnets 42 or the armature coils 44 is suspended. Therefore, alternate current power generating voltage of the armature coils 44 can be voltage twice more than a case that either one of the magnets 42 or the armature coils 44 is suspended.

Also, by increasing diameters of the inner rotating member 47 and the outer rotating member 45, the magnets 42 and the armature coils 44 can be enlarged easily.

Also, the first windmill 20 and the second windmill 30 rotate in the opposite direction to each other approximately at the same speed, so that rotation torque acting on the frame (such as the column 12A) is cancelled so as to provide stable rotation.

Also, the above embodiment is configured that length in a vertical direction of the blade 32 of the second windmill 30 is longer than that of the blade 22 of the first windmill 20, however lengths of the blade 22 and the blade 32 can be the same. Generally, wind force is stronger at a higher position in elevation than at a lower position, and according to this embodiment, by having a longer length of the blade 32 of the second windmill 30 disposed at a lower side, the first windmill 20 and the second windmill 30 can rotate well-balanced.

INDUSTRIAL APPLICABILITY

The wind power generator relating to the present invention can be used in a power generating field. Also, the wind power generator relating to the present invention is suitable for not only large-scaled, but also domestic use and medium or small scaled.

REFERENCE NUMBERS

10 Wind power generator
20 Windmill
20F Wind tunnel
22 Blade
26H High speed airflow passing surface
26L Low speed airflow passing surface
26F Front nose surface
26 Front plate
28 Back plate
30 Windmill
30F Wind Tunnel
32 Blade
36 Front plate
38 Back plate
40 Power generating device
42 Magnet
44 Armature coil
45 Outer rotating member
47 Inner rotating member

What is claimed is:

1. A blade for a windmill being disposed around a rotation center in a vertical direction so as to receive wind force, wherein the edge of the blade viewed from the vertical direction is formed by:
   a front surface curved convexly toward a front traveling direction of rotation about the rotation center, as viewed from the vertical direction; and
   a back surface, curved concavely toward a back traveling direction of rotation about the rotation center, being disposed on a back surface side of the blade and extending between a low speed back end portion and a high speed back end portion, the low speed back end portion being disposed closer to the rotation center than the high speed back end portion, and
   the front surface includes:
   a front nose surface being disposed at front of the blade with respect to the front traveling direction, also having a greatest average curvature, the front nose surface including a front portion disposed at a forward-most portion of the blade with respect to the front traveling direction and closer to the rotation center than the high speed back end portion,
   a low speed airflow passing surface disposed on a closer side to the rotation center, and formed continuously from the front nose surface, along the back traveling direction, to the low speed back end portion, and
   a high speed airflow passing surface disposed on a distant side from the rotation center, formed continuously from the front nose surface, along the back traveling direction to a high speed back end portion, with a curved surface swollen greater than the low speed airflow passing surface, and having length as viewed from the vertical direction greater than the low speed airflow passing surface, and
   wherein, when receiving wind only from the front, the blade produces lift force including a component in the reverse direction of the wind from the front.

2. The blade for a windmill as claimed in claim 1, wherein the back surface has an arc shape having a smaller curvature than the average curvature of the front surface.

3. The blade for a windmill as claimed in claim 2, wherein the rotation center is disposed on an extension of an arc composed of the back surface, as viewed from a vertical direction.

4. A windmill provided with a rotation center in a vertical direction, and comprising a plurality of the blades around the rotation center as claimed in claim 1.

5. The windmill claimed in claim 4, comprising a wind tunnel between the blades for the windmill and the rotation center, so as to allow wind to pass through.

6. The windmill claimed in claim 4, wherein three blades for the windmill are disposed around the rotation center at an equally-spaced center angle.

7. The windmill claimed in claim 6, wherein, as viewed from a vertical direction,
   a traveling direction back end portion of the high speed airflow passing surface is disposed at the farthermost position form the rotation center, and
   a traveling direction back end portion of the low speed airflow passing surface is disposed at a closest position to the rotation center.

8. The windmill claimed in claim 5, as viewed from a vertical direction, under a definition of
   a first line passing through a back end of the traveling direction of the low speed airflow passing surface and the rotation center,
   a second line passing through a front portion of the traveling direction of the blade for the windmill and the rotation center and a third line passing through a back end of the traveling direction of the high speed airflow passing surface and the rotation center, wherein an angle .theta.2 formed between the first line and the third line is greater than an angle .theta.1 formed between the first line and the second line.

9. A wind power generator provided with the windmill claimed in claim 4.

10. The wind power generator claimed in claim 9, comprising:

a first windmill comprising the windmill provided with a rotation center in a vertical direction, and having a plurality of the blades for a windmill being disposed around a rotation center in a vertical direction so as to receive wind force, a second windmill provided with a rotation center in a vertical direction, and having a plurality of the blades for a windmill being disposed around a rotation center in a vertical direction so as to receive wind force, said second windmill having a common rotation center with the first windmill, and disposed so as to rotate in a direction opposite of the first windmill, and a power generating device disposed between the first windmill and the second windmill, and provided with a field magnet linked with rotation of the first windmill so as to rotate in the same direction as the first windmill and an armature coil linked with rotation of the second windmill so as to rotate in the same direction as the second windmill.

11. The windmill claimed in claim 4, wherein the back surface of the blade has an arc shape having a smaller curvature than the average curvature of the front surface.

12. The windmill claimed in claim 11, further comprising:

a wind tunnel between the blades for the windmill and the rotation center, so as to allow wind to pass through.

13. The windmill claimed in claim 12, as viewed from a vertical direction, under a definition of:

a first line passing through a back end of the traveling direction of the low speed airflow passing surface and the rotation center, a second line passing through a front portion of the traveling direction of the blade for the windmill and the rotation center and a third line passing through a back end of the traveling direction of the high speed airflow passing surface and the rotation center, wherein an angle .theta.2 formed between the first line and the third line is greater than an angle .theta.1 formed between the first line and the second line.

14. A wind power generator provided with the windmill claimed in claim 5.

15. A wind power generator provided with the windmill claimed in claim 8.

16. The wind power generator of claim 9, comprising:

a first windmill, a second windmill, having the common rotation center with the first windmill, and disposed to rotate in an opposite direction from the first windmill, and a power generating device disposed between the first windmill and the second windmill, and provided with:

a field magnet linked with rotation of the first windmill so as to rotate in the same direction as the first windmill and an armature coil linked with rotation of the second windmill so as to rotate in the same direction as the second windmill.

17. A wind power generator comprising the windmill of claim 8, said wind power generator comprising:

a first windmill, a second windmill having the common rotation center with the first windmill, and disposed to rotate in an opposite direction from the first windmill, and a power generating device disposed between the first windmill and the second windmill, and provided with a field magnet linked with rotation of the first windmill so as to rotate in the same direction as the first windmill and an armature coil linked with rotation of the second windmill so as to rotate in the same direction as the second windmill.

18. A wind power generator comprising the windmill of claim 11, said wind power generator comprising:

a first windmill, a second windmill having the common rotation center with the first windmill, and disposed to rotate in an opposite direction from the first windmill, and a power generating device disposed between the first windmill and the second windmill, and provided with a field magnet linked with rotation of the first windmill so as to rotate in the same direction as the first windmill and an armature coil linked with rotation of the second windmill so as to rotate in the same direction as the second windmill.

19. A wind power generator comprising the windmill of claim 12, said wind power generator comprising:

a first windmill, a second windmill comprising having the common rotation center with the first windmill, and disposed to rotate in an opposite direction from the first windmill, and a power generating device disposed between the first windmill and the second windmill, and provided with a field magnet linked with rotation of the first windmill so as to rotate in the same direction as the first windmill and an armature coil linked with rotation of the second windmill so as to rotate in the same direction as the second windmill.

20. A wind power generator comprising the windmill of claim 13, said wind power generator comprising:

a first windmill, a second windmill having the common rotation center with the first windmill, and disposed to rotate in an opposite direction from the first windmill, and a power generating device disposed between the first windmill and the second windmill, and provided with a field magnet linked with rotation of the first windmill so as to rotate in the same direction as the first windmill and an armature coil linked with rotation of the second windmill so as to rotate in the same direction as the second windmill.

\* \* \* \* \*